United States Patent
Chisholm

(10) Patent No.: US 7,169,375 B2
(45) Date of Patent: Jan. 30, 2007

(54) METAL OXIDE NANOPARTICLES, METHODS OF MAKING, AND METHODS OF USE

(75) Inventor: Bret Ja Chisholm, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 447 days.

(21) Appl. No.: 10/652,812

(22) Filed: Aug. 29, 2003

(65) Prior Publication Data

US 2005/0063898 A1 Mar. 24, 2005

(51) Int. Cl.
*C01G 1/00* (2006.01)
*C01G 23/00* (2006.01)

(52) U.S. Cl. .............. 423/592.1; 423/608; 423/610; 423/263; 423/618; 977/773; 977/775; 977/777; 977/811

(58) Field of Classification Search ............ 423/592.1, 423/608, 610, 263, 618; 977/773, 775, 777, 977/811
See application file for complete search history.

(56) References Cited

U.S. PATENT DOCUMENTS

| | | | |
|---|---|---|---|
| 5,411,761 A | 5/1995 | Inokuchi et al. | |
| 5,604,071 A | 2/1997 | Okado et al. | |
| 5,686,054 A * | 11/1997 | Barthel et al. | ............... 423/335 |
| 6,261,700 B1 | 7/2001 | Olson et al. | |
| 6,291,070 B1 | 9/2001 | Arpac et al. | |
| 6,329,058 B1 | 12/2001 | Arney et al. | |
| 6,432,526 B1 | 8/2002 | Arney et al. | |
| 7,081,234 B1 * | 7/2006 | Qi et al. | ................... 423/592.1 |

FOREIGN PATENT DOCUMENTS

| | | |
|---|---|---|
| EP | 1092757 A | 4/2001 |
| WO | WO 98/51747 | 11/1998 |
| WO | WO 00/06622 | 2/2000 |

OTHER PUBLICATIONS

JP2003054951; Feb. 26, 2003; Abstract Only (1 page).
EP1510557A3 European Search Report; Application No. EP04255166; Date of Completion of Search Nov. 17, 2005, (2 pages).

* cited by examiner

*Primary Examiner*—Timothy C. Vanoy
(74) *Attorney, Agent, or Firm*—Cantor Colburn LLP

(57) ABSTRACT

Disclosed is a method of preparing treated metal oxide nanoparticles from sols prepared from metal alkoxides and organosilanes. The treated nanoparticles are useful high refractive index additives in the manufacture of optical articles.

15 Claims, No Drawings

METAL OXIDE NANOPARTICLES, METHODS OF MAKING, AND METHODS OF USE

BACKGROUND OF INVENTION

Nanoparticles of metal oxides have known application as additives for polymeric material as a means to increase the material's overall refractive index. Such additives are useful for the preparation of optical articles that transmit or reflect light. Articles that benefit from the addition of high refractive index additives include, optical lenses, light management films, Fresnel lenses, antireflective coatings, optical disks, diffuser films, holographic substrates, and the like. Although the metal oxide nanoparticles provide an increase in refractive index to the polymeric material, it is preferable that the metal oxide nanoparticles do not decrease other desirable optical or physical properties of the material, such as transparency, low haze, and low color.

The transparency of the a polymeric composite containing the metal oxide nanoparticles is dependent upon the sizes and refractive indexes of the metal oxide particles dispersed within the polymeric material. If the metal oxide particles have large mean diameters, the transparency of the polymeric material may be diminished as light directed at the material would be reflected back to the light source or deflected to the side, reducing the apparent transparency. The transparency of the material may be diminished by the addition of very small metal oxide particles, as the particles tend to agglomerate within the polymer and act as larger particles that may scatter or reflect light. For a transparent composite, the small metal oxide particles are preferably highly dispersed (non-agglomerated) in the polymer to avoid light scattering.

The nanoparticles of metal oxides may be treated with an organic compound to help prevent agglomeration of the particles in the polymer material. It is believed that the organic compound stabilizes the dispersion of the metal oxide particles and inhibits agglomeration. Although there are known methods of treating metal oxide nanoparticles with organic compounds, there remains a need in the art for simpler methods of preparing such nanoparticles. There is also the continuing need for preparing nanoparticles that can be used as additives for polymeric material to provide an increase in the polymeric material's refractive index without causing an increase in color or loss of other optical properties.

SUMMARY OF INVENTION

In one embodiment, a method of making metal oxide nanoparticles comprises hydrolyzing metal alkoxide with an acidic alcohol solution, wherein the acidic alcohol solution comprises an alkyl alcohol, water, and an acid to form a first sol comprising metal oxide nanoparticles; treating the first sol with an organosilane to form a second sol comprising treated metal oxide nanoparticles; and treating the second sol with an organic base in an amount of about 0.1:1 to about 0.9:1 molar ratio of organic base to acid to form a third sol comprising treated metal oxide nanoparticles.

In another embodiment, a method of making titanium oxide nanoparticles comprises hydrolyzing titanium tetraalkoxide with an acidic alcohol solution to form a first sol comprising titanium oxide nanoparticles, wherein the acidic alcohol solution comprises an alkyl alcohol, water in an amount of about 0.1:1 to about 5:1 molar ratio of water to titanium tetraalkoxide, and an acid in an amount of about 0.1:1 to about 2:1 molar ratio of acid to titanium tetraalkoxide; treating the first sol with an organosilane to form a second sol comprising treated titanium oxide nanoparticles; and treating the second sol with an organic base in an amount of about 0.1:1 to about 0.9:1 molar ratio of organic base to acid to form a third sol comprising treated titanium oxide nanoparticles.

In yet another embodiment, a composition comprises a polymerizable compound; and treated titanium oxide nanoparticles, wherein the treated titanium oxide nanoparticles are prepared by hydrolyzing titanium tetraalkoxide with an acidic alcohol solution to form a first sol, wherein the acidic alcohol solution comprises an alkyl alcohol, water in an amount of about 0.1:1 to about 5:1 molar ratio of water to titanium tetraalkoxide, and an acid in an amount of about 0.1:1 to about 2:1 molar ratio of acid to titanium tetraalkoxide; treating the first sol with an organosilane to form a second sol; and treating the second sol with an organic base in an amount of about 0.1:1 to about 0.9:1 molar ratio of organic base to acid to form a third sol comprising treated titanium oxide nanoparticles.

DETAILED DESCRIPTION

As used herein, "sol" means a colloid in which small particles are suspended in a continuous liquid phase.

As used herein, "(meth)acrylate" is inclusive of both acrylate and methacrylate functionality, in addition to thioester(meth)acrylate functionality.

All ranges disclosed herein are inclusive and combinable.

A simple and efficient method of preparing organosilane treated metal oxide nanoparticle sols, especially titanium oxide nanoparticle sols, is described herein along with methods of preparing mixtures of the sols with polymerizable compounds to form polymerizable compositions having increased refractive indices. The polymerizable compositions and articles prepared from the cured compositions exhibit greater optical properties than materials prepared without the sols, including increased refractive indices, good transmittance of light, and low haze.

Also disclosed herein is a method of preparing metal oxide sols by the addition of an organic base to the treated metal oxide sols. The sols containing the organic base, when combined with polymerizable compounds, provide low color polymerizable compositions and cured products.

Finally, a method is disclosed to prepare treated metal oxide sols that, when combined with a polymerizable material, provides a cured product exhibiting reduced shrinkage and reduced brittleness. Specifically, the treated metal oxide sols are prepared by treating the metal oxide nanoparticles with organosilanes that do not contain groups reactive with the polymerizable compounds.

The metal oxide sols may be prepared from metal alkoxides according to the following general structure M(alkoxide)$_v$, wherein M can be silicon, titanium, zirconium, cerium, tin, and the like; and v is the oxidation state of the metal. Preferably M is titanium, zirconium, cerium, or tin and more preferably titanium. Typically the metal oxide sols are prepared by the hydrolysis of the metal alkoxides, for example Ti(alkoxide)$_4$, in an acidic alcohol solution comprising enough water for the hydrolysis. Suitable alkoxides include linear or branched $C_1$–$C_{12}$ alkoxides such as, for example, ethoxide, 1-propoxide, isopropoxide, 1-butoxide, 2-butoxide, tert-butoxide, 1-hexoxide, 2-ethylhexoxide, 2-methoxy-1-ethoxide, and the like. Preferred alkoxides include isopropoxide, ethoxide, and 2-ethylhexoxide. The alkoxides of the titanium alkoxide may be the same or different. A suitable commercially available titanium alkoxide includes titanium tetraisopropoxide.

The hydrolysis of the metal alkoxide is performed in an acidic alcohol solution, preferably an acidic alcohol solution comprising water and an alkyl alcohol. Suitable alcohols include linear or branched chain $C_1$–$C_{12}$ alkyl alcohols, for example, methanol, ethanol, isopropanol, 2-propanol, 1-butanol, 2-butanol, 2-ethyl hexanol, and the like.

The amount of alkyl alcohol in the acidic alcohol solution can readily be determined by one of skill in the art, but is preferably about 40 weight percent to about 99 weight percent alcohol, more preferably about 50 percent to about 97 weight percent, and even more preferably about 60 weight percent to about 95 weight percent based on the total weight of the acidic alcohol solution.

The acidic alcohol solution is preferably made acidic with an inorganic acid such as, for example, hydrochloric acid, hydrobromic acid, sulfuric acid, phosphoric acid, and the like. Not wishing to be bound by theory, it is theorized that the acid in the solvent stabilizes the resulting sol and prevents the metal oxide nanoparticles from agglomerating by creating a net positive charge at the surface of the particles resulting in electrostatically stabilized particles.

The amount of acid used in the acidic alcohol solution can readily be determined by one of skill in the art, and is preferably about an equimolar amount in relation to the amount of metal alkoxide. The amount of acid may be about 0.1:1 to about 2:1 molar ratio of acid to metal alkoxide, preferably about 0.3:1 to about 1.5:1 molar ratio, more preferably about 0.5:1 to about 1:1 molar ratio, and yet more preferably about 0.6:1 to about 0.8:1 molar ratio of acid to metal alkoxide.

The water used to prepare the metal oxide sol is preferably free of minerals, for example deionized water. An amount of water to hydrolyze the metal alkoxide can readily be determined by one of skill in the art, and is preferably in about an equimolar amount in relation to the amount of metal alkoxide. The amount of water may be about 0.1:1 to about 5:1 molar ratio of water to metal alkoxide, preferably about 0.5:1 to about 3:1 molar ratio, more preferably about 0.7:1 to about 2:1 molar ratio, and yet more preferably about 0.9:1 to about 1.1:1 molar ratio of water to metal alkoxide.

The hydrolysis of the metal alkoxide and formation of the sol may be accomplished by adding the metal alkoxide to the acidic alcohol solution and water with stirring. The hydrolysis may be performed at temperatures of about −20° C. to about 60° C., preferably at temperatures of about 0° C. to about 40° C., and more preferably at about 10° C. to about 25° C. Preferably the reaction is performed at ambient temperatures. Typically, the solution is stirred for a time sufficient to form the sol, about one hour to about two weeks, preferably about 6 hours to about 4 days, and more preferably about 12 hours to about 24 hours, although other reaction times may be used as long as a stable sol is obtained.

Typically, the metal oxide particles in the sol may have a size of about 1 nanometer to about 100 nanometers, preferably about 2 nanometers to about 40 nanometers, and more preferably about 3 nanometers to about 20 nanometers.

Once the metal oxide sol is formed, the nanoparticles within the sol may be treated with an organosilane to produce a treated metal oxide nanoparticle sol. Not wishing to be bound by theory, it is believed that the organosilane helps to prevent or minimize particle aggregation when the metal oxide nanoparticles are combined with polymerizable compounds, such as (meth)acrylates. Suitable organosilanes include alkoxyorganosilane, aryloxyorganosilane, arylalkoxyorganosilane, arlyalkylalkoxyorganosilane, alkylaminoorganosilane, combinations thereof, and the like. Suitable organosilanes include, for example, phenyl trimethoxysilane, phenethyl trimethoxysilane, diphenyldimethoxysilane, hexamethyldisilazane, trimethoxy(3-methoxypropyl)silane, 3-(trimethoxysilyl)propyl acetate, and the like. The organosilane is preferably chosen to provide the maximum increase in refractive index to polymeric compositions comprising the treated metal oxide nanoparticles. Organosilanes having high refractive indices include the aryl-containing organosilanes, as compared to the alkyl-containing organosilanes, and bromine substituted organosilanes.

Reactive-group containing organosilanes may also be used to treat the metal oxide nanoparticles in the sol. These organosilanes contain one or more reactive functionalities such as epoxy, acrylate, methacrylate, and the like that may react with the polymerizable compounds described herein. Suitable reactive-group containing organosilanes include, for example, methacryloxypropyl trimethoxysilane, acryloxypropyl trimethoxysilane, methacryloxypropyl triethoxysilane, acryloxypropyl triethoxysilane, glycidoxypropyl trimethoxysilane, and glycidoxypropyl triethoxysilane.

In one embodiment, the organosilane preferably does not contain reactive-group functionality. Metal oxide nanoparticles treated with organosilanes lacking reactive-group functionality should provide compositions comprising polymerizable compounds that shrink less and are less brittle upon curing. The cured material would be less brittle and exhibit less shrinkage due to the lower crosslink density imparted by the lack of reactive group functionality of the treated metal oxide nanoparticles.

The treatment of the nanoparticles with the organosilane may be performed at temperatures of about 0° C. to about 125° C., preferably at temperatures of about 25° C. to about 100° C., more preferably at about 40° C. to about 75° C., and yet more preferably at about 50° C. to about 60° C. The time for the treatment may be about 10 minutes to about 24 hours, preferably about 1 hour to about 12 hours, and more preferably about 4 hours to about 8 hours.

The organosilane may be added to the metal oxide nanoparticles in an amount of about 1:1 to about 1:10 molar ratio of metal alkoxide to organosilane, preferably about 1:2 to about 1:8 molar ratio, more preferably about 1:4 to about 1:6 molar ratio of metal alkoxide to organosilane.

It has been surprisingly found that the addition of a small amount of an organic base, especially non-nucleophilic bases, to the treated metal oxide sol provides a high refractive index additive for polymerizable compounds that is much lower in color. Polymerizable compositions comprising the treated metal oxide sol and base are shown to have reduced color as compared to the corresponding compositions prepared from sols lacking the base. Furthermore, cured materials prepared from the mixture of a sol containing base and a polymerizable compound also exhibit less color. Suitable organic bases include linear or branched chain $C_1$–$C_{12}$ alkylamines, such as, for example, trimethylamine, triethylamine, tri-n-propylamine, tri-isopropylamine, tri-n-butylamine, tri-tert-butylamine, and the like.

The amount of organic base added to the treated metal oxide sol is preferably less than an equimolar amount relative to the amount of acid used in the sol preparation. An amount of organic base added to the sol may be in a molar ratio of organic base to acid of about 0.1:1 to about 0.9:1, preferably about 0.3:1 to about 0.8:1, more preferably about 0.4:1 to about 0.7:1, and yet more preferably about 0.5:1 to about 0.6:1 based on the molar ratio of organic base to acid used to prepare the sol.

Polymerizable compositions comprising the treated metal oxide nanoparticles may be prepared by combining one or more polymerizable compounds with the treated metal oxide sol followed by removal of the solvent. Polymerizable compounds, as used herein, are monomers or oligomers comprising one or more functional groups capable of undergoing radical, cationic, anionic, thermal, or photochemical polymerization. Suitable functional groups include acrylate, methacrylate, vinyl, epoxide, and the like.

Suitable polymerizable compounds include (meth)acrylates, such as mono- and polyfunctional (meth)acrylates. The particular choice of (meth)acrylate may be based on the targeted refractive index desired, ease of processing, and ease of combining additional polymerizable compounds and/or polymerization initiators. Exemplary (meth)acrylates include those according to general structure (I)

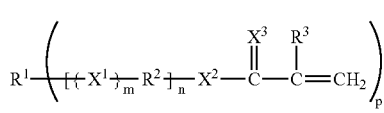

(I)

wherein $R^1$ is substituted or unsubstituted $C_1$–$C_{12}$ alkyl, cycloalkyl, alkenyl, cycloalkenyl, or alkynyl; or substituted or unsubstituted $C_6$–$C_{16}$ aryl, including phenyl, wherein the substitution independently includes fluorine, chlorine, bromine, iodine, $C_1$–$C_6$ alkyl, $C_1$–$C_3$ perhalogenated alkyl, $C_1$–$C_6$ alkoxy, hydroxy, $C_1$–$C_6$ ketone, $C_1$–$C_6$ ester, N,N—($C_1$–$C_3$) alkyl substituted amide, or a combination comprising at least one of the forgoing substituents, and wherein the $C_6$–$C_{16}$ aryl group, when substituted, may be mono-, di-, tri-, tetra- or penta-substituted;

$R^2$ is substituted or unsubstituted $C_1$–$C_{12}$ alkylene, cycloalkylene, alkenylene, cycloalkenylene, or alkynylene; or substituted or unsubstituted $C_6$–$C_{16}$ arylene, including phenylene, wherein the substitution independently includes fluorine, chlorine, bromine, iodine, $C_1$–$C_6$ alkyl, $C_1$–$C_3$ perhalogenated alkyl, $C_1$–$C_6$ alkoxy, hydroxy, $C_1$–$C_6$ ketone, $C_1$–$C_6$ ester, N,N-($C_1$–$C_3$) alkyl substituted amide, or a combination comprising at least one of the forgoing substituents, and wherein the $C_6$–$C_{16}$ aryl group, when substituted, may be mono-, di-, tri-, or tetra-substituted;

$R^3$ is hydrogen, methyl, or ethyl;

$X^1$ and $X^2$ are each independently O, S, or $NR^4$, wherein $R^4$ is hydrogen or $R^1$;

$X^3$ is O or S;

m is 0 or 1;

n is 0, 1, 2, or 3; and p is 1, 2, 3, or 4.

Further suitable polymerizable compounds include the (meth)acrylate represented by the formula (II)

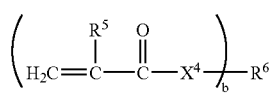

(II)

wherein $R^5$ is hydrogen or methyl; $X^4$ is O, S, or $NR^7$, wherein $R^7$ is hydrogen or $C_1$–$C_6$ alkyl; $R^6$ is substituted or unsubstituted $C_1$–$C_{300}$ alkyl, aryl, alkaryl, arylalkyl, or heteroaryl; and b is 2, 3, or 4. The substitution on $R^6$ includes, but is not limited to, fluorine, chlorine, bromine, iodine, $C_1$–$C_6$ alkyl, $C_1$–$C_3$ perhalogenated alkyl, hydroxy, $C_1$–$C_6$ ketone, $C_1$–$C_6$ ester, N,N—($C_1$–$C_3$) alkyl substituted amide, or a combination comprising at least one of the forgoing substituents. Preferred $R^6$ groups include such groups as alkylene and hydroxy alkylene disubstituted bisphenol-A or bisphenol-F ethers, especially the brominated forms of bisphenol-A and -F. Suitable $R^6$ groups include those according to the formula (III)

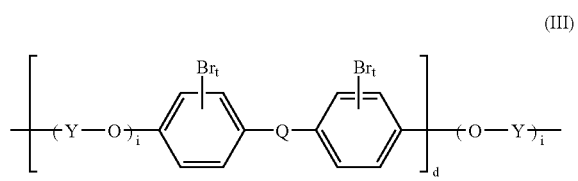

(III)

wherein Q is —C(CH$_3$)$_2$—, —CH$_2$—, —C(O)—, —S(O)—, or —S(O)$_2$—; Y is $C_1$–$C_6$ alkyl or hydroxy substituted $C_1$–$C_6$ alkyl; i is 1 to 10; t is 0, 1, 2, 3, or 4; and d is about 1 to about 3.

The (meth)acrylates according to formula (II) may include compounds produced by the reaction of an acrylic or methacrylic acid with a di-epoxide, such as bisphenol-A diglycidyl ether; bisphenol-F diglycidyl ether; tetrabromo bisphenol-A diglycidyl ether; tetrabromo bisphenol-F diglycidyl ether; 1,3-bis-{4-[1-methyl-1-(4-oxiranylmethoxy-phenyl)-ethyl]-phenoxy}-propan-2-ol; 1,3-bis-{2,6-dibromo-4-[1-(3,5-dibromo-4-oxiranylmethoxy-phenyl)-1-methyl-ethyl]-phenoxy}-propan-2-ol; and the like; and a combination comprising at least one of the foregoing di-epoxides. Examples of such compounds include 2,2-bis(4-(2-(meth)acryloxyethoxy)phenyl)propane; 2,2-bis((4-(meth)acryloxy)phenyl)propane; acrylic acid 3-(4-{1-[4-(3-acryloyloxy-2-hydroxy-propoxy)-3,5,-dibromo-phenyl]-1-methyl-ethyl}-2,6-dibromo-phenoxy)-2-hydroxy-propyl ester; acrylic acid 3-[4-(1-{4-[3-(4-{1-[4-(3-acryloyloxy-2-hydroxy-propoxy)-3,5-dibromo-phenyl]-1-methyl-ethyl}-2,6-dibromo-phenoxy)-2-hydroxy-propoxy]-3,5-dibromo-phenyl}-1-methyl-ethyl)-2,6-dibromo-phenoxy]-2-hydroxy-propyl ester; and the like, and a combination comprising at least one of the foregoing multifunctional (meth)acrylates. A suitable multifunctional (meth)acrylate based on the reaction product of tetrabrominated bisphenol-A di-epoxide is RDX 51027 available from UCB Chemicals.

Other suitable polymerizable compounds include urethane (meth)acrylates including those prepared by methods well known in the art, such as the reaction of polyfunctional isocyantes with polyfunctional alcohols and hydroxyalkyl (meth)acrylate, or those commercially available.

When highly viscous polymerizable compounds are used, a solvent or a low viscosity polymerizable compound may be used as a diluent, preferably a low viscosity polymerizable compound is used. Preferable solvents for diluting include the alkyl alcohol used in the sol.

The amount of sol combined with the polymerizable compound to form the polymerizable composition may be selected to provide the desired refractive index and/or mechanical properties of the resulting composition, whether polymerized or unpolymerized. The amount of sol combined with the polymerizable compound may be about 1 weight percent to about 80 weight percent metal oxide based on the total of metal oxide and polymerizable compound, preferably about 15 weight percent to about 70 weight percent, more preferably about 25 weight percent to about 60 weight percent, and yet more preferably about 35 to about 50 weight percent metal oxide based on the total weight of metal oxide and polymerizable compound.

The polymerizable composition comprising the treated metal oxide nanoparticles and polymerizable compound may further comprise an initiator to initiate free radical reactions to result in a polymerized material. Suitable polymerization initiators include photoinitiators that promote polymerization of the respective polymerizable groups upon exposure to ultraviolet radiation. Particularly suitable photoinitiators include the ketone-based and phosphine oxide photoinitiators available from Ciba Specialty Chemicals under the tradenames IRGACURE® and DAROCUR™ series, as well as the LUCIRIN® series from BASF Corp., and the ESACURE® series of photoinitiators. Ketone-based photoinitiators include, for example, hydroxy- and alkoxy-alkyl phenyl ketones, and thioalkylphenyl morpholinoalkyl ketones. Also suitable as photoinitiators are benzoin ethers.

The polymerization initiator may also include peroxy-based initiators that promote polymerization under thermal activation. Examples of useful peroxy initiators include, for example, benzoyl peroxide, dicumyl peroxide, methyl ethyl ketone peroxide, lauryl peroxide, cyclohexanone peroxide, t-butyl hydroperoxide, t-butyl benzene hydroperoxide, t-butyl peroctoate, 2,5-dimethylhexane-2,5-dihydroperoxide, 2,5-dimethyl-2,5-di(t-butylperoxy)-hex-3-yne, di-t-butylperoxide, t-butylcumyl peroxide, alpha,alpha'-bis(t-butylperoxy-m-isopropyl)benzene, 2,5-dimethyl-2,5-di(t-butylperoxy)hexane, dicumylperoxide, di(t-butylperoxy isophthalate, t-butylperoxybenzoate, 2,2-bis(t-butylperoxy) butane, 2,2-bis(t-butylperoxy)octane, 2,5-dimethyl-2,5-di (benzoylperoxy)hexane, di(trimethylsilyl)peroxide, trimethylsilylphenyltriphenylsilyl peroxide, and the like, and combinations comprising at least one of the foregoing polymerization initiators.

The polymerization initiator may be used in an amount of about 0.01 to about 10 weight percent based on the total weight of the polymerizable composition, preferably about 0.1 to about 5 weight percent, and more preferably about 0.5 to about 3 weight percent based on the total weight of the polymerizable composition. As used herein, the polymerizable composition is the composition that results from removing the solvent from the mixture comprising treated metal oxide sol and polymerizable compound.

Prior to curing, the solvent present in the mixture comprising the treated metal oxide sol and polymerizable compound is preferably removed to result in a polymerizable composition. Removal of the solvent may be accomplished under reduced pressure and/or heat by distillation or evaporation. For example, in cast films, the treated metal oxide sol and polymerizable compound mixture may be cast as a film and the solvent allowed to flash off prior to curing. In one embodiment, the polymerizable composition is combined with an additional polymerizable compound and/or initiator prior to curing.

Polymerizable compositions comprising the treated metal oxide nanoparticles and polymerizable compound, and their cured products, preferably have a refractive index greater than about 1.50 and more preferably greater than about 1.55. In one embodiment, a polymerizable composition comprises a polymerizable compound and titanium oxide nanoparticles prepared from an organosilane treated titanium oxide sol, wherein the polymerizable composition, and the corresponding cured product, preferably has a refractive index greater than about 1.50 and more preferably greater than about 1.55.

Heat or radiation may be used to cure the polymerizable composition. Radiation curing includes microwave, ultraviolet light, visible light, and/or electron beam. The wavelength of the UV radiation used to cure the polymerizable composition may be from about 1800 angstroms to about 4000 angstroms. The lamp systems used to generate such radiation include ultraviolet lamps and discharge lamps, as for example, xenon, metallic halide, metallic arc, low or high pressure mercury vapor discharge lamp, etc. Curing is meant both polymerization and cross-linking to form a non-tacky material.

When heat curing is used, the temperature selected may be about 80° to about 130° C., preferably about 90° C. to about 100° C. The heating period may be about 30 seconds to about 24 hours, preferably about 1 minute to about 5 hours, and more preferably about 2 minutes to about 3 hours. Such curing may be staged to produce a partially cured and often tack-free composition, which then is fully cured by heating for longer periods or temperatures within the aforementioned ranges.

In one embodiment, the composition may be both heat cured and UV cured.

Articles that can be fabricated from the polymerizable compositions upon curing include, for example, optical articles, such as light management films for use in back-light displays; projection displays; light transmission devices; traffic signals; illuminated signs; optical lenses; Fresnel lenses; optical disks; diffuser films; holographic substrates; or as substrates in combination with conventional lenses, prisms or mirrors.

In backlight computer displays or other display systems, optical films are commonly used to direct light. For example, in backlight displays, light management films use prismatic structures (often referred to as microstructure) to direct light along a viewing axis (i.e., an axis substantially normal to the display). Directing the light enhances the brightness of the display viewed by a user and allows the system to consume less power in creating a desired level of on-axis illumination.

All cited patents, patent applications, and other references are incorporated herein by reference in their entirety. The invention is further illustrated by the following non-limiting examples.

EXAMPLES

The following procedures were used herein unless otherwise stated.

The particle sizes of the metal oxide nanoparticles were obtained using a High Performance Particle Sizer from Malvern Corporation.

The refractive index (RI) was measured using a Bausch and Lomb Abbe-3L refractometer having a wavelength associated with the measurement of 589.3 nanometers.

The yellowness index (YI) of the compositions and the corresponding cured films were measured using a Gretag Macbeth Color-Eye 7000A colorimeter according to ASTM D1925. When the polymerizable compositions were analyzed for YI, a sample of composition was measured in a cuvette with a path length of 1 mm.

The viscosity of the polymerizable compositions was measured using a Brookfield LVDV-II Cone/Plate Viscometer at 25° C., with a CPE40 or CPE51 spindle attachment, 0.5 mL polymerizable composition sample volume while maintaining a torque range within 15% to 90% of the equipment maximum for the specific cone attachment. The viscosity measurements are provided in centipoise (cP).

Cured films were prepared using a custom-made laminating unit and Fusion EPIC 6000UV curing system. The laminating unit consists of two rubber rolls: a bottom variable speed drive roll and a pneumatically driven top nip roll. This system is used to press together laminate stacks that are passed between the rolls: the laminate stacks contain a highly polished, flat, chrome-plated 5 by 7-inch (12.7 by 17.8 centimeter) steel plate lying face up, a polymerizable composition coated on the plate, and a film substrate placed on the top of the polymerizable composition. Approximately 0.5 mL of polymerizable composition was transferred to the plate in a continuous line at the front, or leading edge of the plate. A 0.005-inch (0.127 centimeter) thick polycarbonate film substrate was then placed over the polymerizable composition and the resulting stack sent through the laminating unit to press and distribute the polymerizable composition uniformly between the plate and film substrate. With higher viscosity formulations, higher pressure and lower speeds were used and the plate was heated to obtain the desired thickness. Photopolymerization of the polymerizable composition within the stack was accomplished by passing the stack twice under a 600-watt H-bulb at a speed of 10 feet/minute (0.051 meters/second), using high power and a focal length of 2.1 inches (5.3 centimeter), curing through the film substrate top layer.

The color of the cured films was determined by measuring L*, a*, and b* using a Gretag Macbeth Color-Eye 7000A colorimeter using L*, a*, b* color space, the D65 illuminant, and a 10 degree observer inclusive of a specular reflection.

The percent (%) haze and % transmission of light of the cured films were determined according to ASTM D1003 using a BYK-Gardner Haze-guard Plus Hazemeter.

Examples 1–9

Preparation of Titanium Oxide Sols and Organosilane Functionalization

Titanium oxide sols were prepared by slowly adding titanium tetraisopropoxide (TiOPr), available from Aldrich Chemical, to a rapidly stirring solution of isopropanol (IPA), concentrated (37% by weight) hydrochloric acid (HCl), and deionized (DI) water according to the formulas in Table 1 (Examples 1–9). The resulting mixtures were stirred at room temperature for approximately 24 hours resulting in the formation of sols. The mixture for Examples 1–6 were transparent upon addition of TiOPr to the solution while the mixture for Example 8 was milky in appearance and the mixtures for Examples 7 and 9 gelled. It has been determined that to prepare a stable sol, the amount of acid and water must chosen to provide particles of titanium oxide that do not agglomerate. Insufficient acid for the water content used in Examples 7 and 9, resulted in the formation of gels instead of sols. The sizes of the titanium oxide nanoparticles in the sols were measured for Examples 1–6 and 8, and the results are provided in Table 1 in units of nanometer (nm).

After formation of the titanium oxide sols, 20.63 grams (g) of methacryloxypropyl trimethoxysilane (MAPTMS), available from Aldrich Chemical, was added to each the sols of Examples 1–6 and 8, and heated at 50° C. for 5 hours. During the heating process, the sample for Example 8 changed from a milky appearance to transparent. After treatment with MAPTMS, the sample for Example 8 remained transparent at room temperature, but would reversibly turn milky when placed in a refrigerator.

TABLE 1

| Component | Example |  |  |  |  |  |  |  |  |
|---|---|---|---|---|---|---|---|---|---|
|  | 1 | 2 | 3 | 4 | 5 | 6 | 7 | 8 | 9 |
| IPA (g) | 1000 | 1000 | 1000 | 1000 | 1000 | 1000 | 1000 | 1000 | 1000 |
| HCl (37 wt %, g) | 49.05 | 49.05 | 49.05 | 24.53 | 24.53 | 24.53 | 12.26 | 12.26 | 12.26 |
| $H_2O$ (g) | 5.25 | — | 10.65 | 14.33 | 8.93 | 19.73 | 18.86 | 13.46 | 24.26 |
| TiOPr (g) | 105 | 105 | 105 | 105 | 105 | 105 | 105 | 105 | 105 |
| MAPTMS (g) | 20.63 | 20.63 | 20.63 | 20.63 | 20.63 | 20.63 | — | 20.63 | — |
| Particle size (nm) | 4.7 | 4.0 | 4.4 | 10.3 | 6.1 | 10.5/ 39.8/ 288* | gelled | — | gelled |

*A trimodal distribution was observed with the largest distribution being that centered at 39.8 nm.

Examples 10–16

Preparation of Treated Titanium Oxide Nanoparticle/UV Polymerizable Compositions The treated titanium oxide sols prepared in Examples 1–6 and 8 were combined with an acrylate diluent according to the formulations in Table 2 to form treated titanium oxide sol/UV polymerizable diluent compositions. 2-Phenoxyethyl acylate (PEA), available from Sartomer as SR339, was slowly added to the treated titanium oxide sol using rapid stirring during the addition. The resulting sol/PEA mixture was then solvent stripped using a rotary evaporator operating at a temperature between 40–50° C. and full vacuum to result in a polymerizable composition. The refractive index (RI) and yellowness index (YI) results of Examples 10–16 are provided in Table 2. For comparison, the RI of PEA is 1.5181 and the YI of PEA is 0.96.

TABLE 2

| Component | Example |  |  |  |  |  |  |
|---|---|---|---|---|---|---|---|
|  | 10 | 11 | 12 | 13 | 14 | 15 | 16 |
| Sol, (g) | Ex. 1, 500.13 | Ex. 2, 500.01 | Ex. 3, 500 | Ex. 4, 500.02 | Ex. 5, 500 | Ex. 6, 500 | Ex. 8, 500.35 |

TABLE 2-continued

| | Example | | | | | | |
|---|---|---|---|---|---|---|---|
| Component | 10 | 11 | 12 | 13 | 14 | 15 | 16 |
| PEA (g) | 50.02 | 50.04 | 50 | 50.03 | 50 | 50 | 50 |
| | High HCl/ Med. $H_2O$ | High HCl/ Low $H_2O$ | High HCl/ High $H_2O$ | Med. HCl/ Med. $H_2O$ | Med. HCl/ Low $H_2O$ | Med. HCl/ High $H_2O$ | Low HCl/ Low $H_2O$ |
| RI | 1.5496 | 1.5571 | 1.5551 | 1.5611 | 1.5487 | 1.5426 | 1.5515 |
| YI | 56.52 | 73.53 | 70.29 | 74.04 | 60.22 | 39.41 | 85.61 |

As illustrated in the results of Table 2, the treated titanium oxide sols of Examples 1–6 and 8 provided treated titanium oxide nanoparticle/PEA polymerizable compositions exhibiting good RI (above 1.54) when compared to the PEA alone.

EXAMPLES 17–24

Preparation of Titanium Oxide Nanoparticle/UV Polymerizable Compositions

The titanium oxide nanoparticle/PEA compositions (Examples 10–16) were further combined with a diacrylate compound to produce polymerizable compositions comprising titanium oxide nanoparticles, a methacrylate diluent (PEA), and an additional polymerizable compound. The polymerizable compositions were prepared by combining, in a 1:1 ratio by weight, the treated titanium oxide nanoparticle/PEA compositions of Examples 10–16 with a diacrylate tetrabromobisphenol A di-epoxide, available from UCB Chemicals under the tradename RDX51027, and Darocur 4265, available from Ciba Specialty Chemicals. The mixtures were prepared according to the formulations provided in Table 3. Cured films were prepared according to the lamination process described above and cured with an H bulb. The resulting cured films were tested for haze, percent transmission, and yellowness and the results are provided in Table 3. The % haze of a cured film of 1:1 PEA:RDX51027 was 0.31, the % transmittance was 92.3, and the YI was 0.9.

causing some titanium oxide particles to agglomerate and result in a polymerizable composition having increased viscosity and the corresponding cured film having increased haze and decreased light transmission.

Examples 23–26

Illustration of the Affect of Reaction Time in Treating Titanium Oxide Nanoparticles with an Organosilane A batch of titanium oxide sol was prepared according to the following procedure. 105 g of TiOPr was slowly added to a rapidly stirring mixture of 1,000 g of IPA, 49.1 g of concentrated HCl (37% by weight), and 5.25 g DI water. The mixture was allowed to stir for approximately 72 hours. Then, 0.26 g of a 33% by weight solution of 4-Hydroxy-2,2,6,6-tetramethylpiperidinyloxy, free radical scavenger (4-OH TEMPO), available from Aldrich Chemical, in 1-methoxy-2-propanol and 13.75 g of MAPTMS were added to the rapidly stirring solution. A portion (200 g) of the solution was removed from the flask (Sample a) and the remainder was heated from room temperature to 50° C. using a hot plate. When the temperature reached 50° C., after about 47 minutes, 200 g of solution was removed from the flask (Sample b) and the remainder of the solution returned to the hot plate. After 2 hours from initiating heating, another 200 g sample was removed from the flask (Sample c) and the remainder returned to the hot plate. At 3.5 hours of heating, a fourth 200 g aliquot (Sample d) was taken from the solution. At 8 hours of heating at 50° C., the solution had formed a precipitate.

TABLE 3

| | Example | | | | | | |
|---|---|---|---|---|---|---|---|
| Component | 17 | 18 | 19 | 20 | 21 | 22 | 23 |
| Source of titanium oxide nanoparticles | Ex. 10 | Ex. 11 | Ex. 12 | Ex. 13 | Ex. 14 | Ex. 15 | Ex. 16 |
| | High HCl/ Med. $H_2O$ | High HCl/ Low $H_2O$ | High HCl/ High $H_2O$ | Med. HCl/ Med. $H_2O$ | Med. HCl/ Low $H_2O$ | Med. HCl/ High $H_2O$ | Low HCl/ Low $H_2O$ |
| Cured films | | | | | | | |
| % haze | 0.56 | 0.63 | 0.82 | 0.78 | 0.82 | 0.60 | 1.78 |
| % transmission | 90.7 | 91.1 | 90.5 | 88.3 | 88.5 | 91.2 | 83.5 |
| YI | 7.9 | 6.7 | 7.9 | 20.0 | 17.6 | 6.4 | 36.7 |

The cured films prepared from the treated titanium oxide nanoparticle/PEA-RDX51027 mixture exhibited low haze and high light transmission (Examples 17–22). The composition used to prepare Example 23 was more viscous than the other Examples resulting in the formation of a thicker, cured film resulting in a larger YI. It is theorized that there was not enough acid used in the preparation of the sol (Example 8)

Examples 25–28 were prepared by combining each of the four samples a–d with EBECRYL 220 (EB220), a hexafunctionalized aromatic urethane acrylate oligomer available from UCB Chemical. To each of the four 200 g samples a–d, 198 g of a 1:10 solution of (EB220):IPA was added using rapid stirring. Each solution was then solvent stripped between 40–50° C. using a rotary evaporator operating at reduced pressure. UV polymerizable coatings were prepared from each of the solvent stripped solutions by adding approximately 1 percent by weight of a 50 percent solution of Darocur 4265 in 1-methoxy-2-propanol. The coatings were coated on to 4"×4" (10.16 centimeter (cm)×10.16 cm) polycarbonate sheets by heating the solutions to 70° C. to reduce viscosity and then spin coating. UV curing was done by passing the samples three times using an H bulb using a lamp to coating distance of 2.1 inches and a belt speed of 16 feet/minute. The haze was obtained for each cured coating and is provided in Table 4.

TABLE 4

| Example | Sample | Haze |
| --- | --- | --- |
| 25 | a | 5.64 ± 2.24 |
| 26 | b | 2.62 ± 1.29 |
| 27 | c | 1.31 ± 0.15 |
| 28 | d | 1.06 ± 0.15 |

A correlation between the time of treatment of the titanium nanoparticles in the sols and the reduction of haze in cured films prepared from the treated nanoparticles is evident from the haze results of Examples 25–28 in Table 4. These results suggest the formation of more stable nanoparticles having reduced tendency to aggregate in the acrylate. An optimum heating time at 50° C. of approximately 5 hours exists for the organosilane treatment process. The results of Table 4 illustrate that reaction time is important in the step to treat the titanium oxide nanoparticles with an organosilane. Not enough time results in less stable nanoparticles and too much time resulted in the precipitation of the titanium oxide (8 hours of heating at 50° C. resulted in a precipitate). The temperature of the treatment process is also important, too high and the titanium oxide precipitates from the IPA solution.

Examples 29–34

Preparation of Treated Titanium Oxide Sols Using Varying Amounts of Organosilane A treated titanium oxide sol (Solution A) was prepared by slowly adding 105 g of TiOPr to a rapidly stirring mixture of 1,000 g IPA, 49.1 g concentrated HCl (37% by weight), and 5.25 g DI water. The mixture was allowed to stir for approximately 72 hours. Then, the solution was divided up into six 150 g samples to which different amounts of MAPTMS were added and the solutions heated to 50° C. and kept at 50° C. for 5 hours with stirring. The amounts of MAPTMS added to each sample are provided in Table 5.

Next, PEA or phenylthioethyl acrylate (PTEA), available from Bimax Co. under the name BX-PTEA, was added to each mixture in the amounts as provided in Table 5. The addition was made by slowly pouring the acrylate into the rapidly stirring titanium oxide sol. Each solution was then solvent stripped between 40–50° C. using a rotary evaporator operating at reduced pressure to result in treated titanium oxide nanoparticles/UV polymerizable compositions. The refractive index and viscosity was measured for each composition and reported in Table 5. The refractive index of pure PEA and PTEA were determined to be 1.52 and 1.562, respectively, and the viscosities of pure PEA and PTEA were determined to be 10 and 9 cP, respectively.

TABLE 5

| | Example | | | | | |
| --- | --- | --- | --- | --- | --- | --- |
| Component | 29 | 30 | 31 | 32 | 33 | 34 |
| Solution A | 150 g | 150 g | 150 g | 150 g | 150 g | 150 g |
| MAPTMS | 0.89 g | 1.78 g | 3.56 g | 0.89 g | 1.78 g | 3.56 g |
| PEA | 21.52 g | 20.17 g | 20.70 g | — | — | — |
| PTEA | — | — | — | 20.98 g | 20.19 g | 20.30 g |
| RI | 1.566 | 1.564 | 1.560 | 1.603 | 1.600 | 1.594 |
| Viscosity | 1,323 cP | 132 cP | 125 cP | Paste | 1,410 cP | 98 cP |

The results in Table 5 illustrate that polymerizable compositions comprising a treated titanium oxide sol exhibits improved RI over the polymerizable material alone. The viscosity results show that the amount of titanium oxide nanoparticle functionalization with MAPTMS can significantly affect the viscosity of the resulting curable composition. By increasing the amount of MAPTMS, the viscosity decreases. It is theorized that an increased amount of organosilane results in treated titanium oxide nanoparticles that are more stable and less prone to interact with each other or agglomerate in the mixture containing the polymerizable compounds.

Examples 35–37

Cured Films Prepared from Treated Titanium Oxide Sols

A titanium oxide sol was prepared by slowly adding 105.14 g of TiOPr to a rapidly stirring mixture of 1,002.6 g IPA, 49.02 g. concentrated HCl (37% by weight), and 5.32 g. DI water. The mixture was allowed to stir for approximately 24 hours before the addition of 13.86 g of MAPTMS. The mixture was heated at 50° C. for 5 hours with stirring. The solution was allowed to cool to room temperature and 56.7 g. of PEA was slowly added to 564.4 g of the rapidly stirring cooled solution. The solution containing the PEA was solvent stripped between 40–50° C. using a rotary evaporator operating at reduced pressure until no visible sign of solvent removal was observed. The refractive index and viscosity of the final solution (Solution B) were 1.5811 and 158.2 cP at a shear rate of 7.5 1/sec and temperature of 25° C., respectively.

Cured films (Examples 35–37) were prepared from a coating solution made by dissolving 0.059 g of Irgacure 819, available from Ciba Specialty Chemicals, in 10.03 g of Solution B and coated according to the conditions in Table 6. Also provided in Table 6 are the color measurements and percent light transmittance of the cured films.

TABLE 6

| | Example | | | |
|---|---|---|---|---|
| | PC Substrate | 35 | 36 | 37 | 38 |
| Coating condition | | | | | |
| Speed | | 100% | 100% | 30% | |
| Pressure (psi) | | 10 psi | 30 psi | 10 psi | |
| Property | | | | | |
| RI | | | | | 1.6084 |
| % Haze | 0.54 | 0.84 | 0.81 | 1.03 | |
| % Transmission | 93.0 | 91.4 | 91.9 | 92.0 | |
| YI | 0.4 | 6.5 | 5.3 | 3.6 | |
| L | 96.0 | 95.2 | 95.3 | 95.6 | |
| a | 0.0 | −0.4 | −0.3 | −0.2 | |
| b | 0.3 | 3.8 | 3.1 | 2.0 | |

Example 38 in Table 6 was prepared from a mixture of 2.06 g of Solution B and 0.03 g of Darocur 4265 spun coated on a silicon wafer using spin speed of 800 RPM and spin time of 20 seconds. The coating was cured with an H bulb using a lamp to coating distance of 2.1 inches and a belt speed of 16 feet/minute and passing the sample twice under the lamp in a nitrogen atmosphere. The refractive index of the cured film is provided in Table 6.

The results in Table 6 illustrate that cured films having good optical properties may be prepared form the organosilane treated titanium oxide sols.

Examples 39–42 were prepared from a mixture of Solution B and RDX51027. Examples 39 and 40 were made from 0.97 g of RDX51027 and 0.0221 g of Irgacure 819 dissolved in 4.00 g of Solution B. This coating solution was coated onto polycarbonate film using the lamination process and cured with a V bulb. The lamination conditions and optical properties of the resulting cured films are shown in Table 7, Examples 39 and 40.

Examples 41 and 42 were made from 2.00 g of RDX51027 and 0.03 g of Irgacure 819 dissolved in 4.00 g of Solution B. This coating solution was laminated and cured according to Examples 39 and 40. The lamination conditions and optical properties are shown in the Table 7, Examples 41 and 42.

TABLE 7

| | | Example | | | |
|---|---|---|---|---|---|
| Coating condition | PC Substrate | 39 | 40 | 41 | 42 |
| Speed | | 100% | 30% | 100% | 30% |
| Pressure | | 30 psi | 30 psi | 30 psi | 30 psi |
| Film Thickness (micrometer) | | 64 | 33 | 135 | 84 |
| % Haze | 0.54 | 1.10 | 0.83 | 2.16 | 1.03 |
| % Transmission | 93.0 | 87.6 | 89.7 | 83.9 | 87.1 |
| YI | 0.4 | 20.0 | 13.3 | 39.9 | 24.5 |
| L | 96.0 | 93.6 | 94.4 | 90.8 | 92.9 |
| a | 0.0 | −0.3 | −0.3 | 0.9 | 0.0 |
| b | 0.3 | 11.3 | 7.5 | 22.9 | 13.8 |

Examples 43–49

Use of an Organic Amine to Reduce the Yellowness of Treated Titanium Oxide Sol/UV Polymerizable Compositions A preparation of treated titanium oxide sol (Sol C) was prepared for Examples 43–49 by slowly adding 105.0 g of TiOPr to a rapidly stirring mixture of 1,000 g IPA, 24.5 g concentrated HCl (37% by weight), and 14.3 g deionized water. The mixture was allowed to stir for 2 weeks at room temperature before addition of 20.63 g of MAPTMS. The mixture was heated at 50° C. for 5 hours with stirring. The sol (Sol C) was allowed to cool to room temperature before use.

Example 43 was prepared by adding 20 g of PEA to 200 g of Sol C with rapid stirring. The solution was transferred to a round-bottomed flask and solvent stripped between 40–50° C. using a rotary evaporator operating at reduced pressure until no visible sign of solvent removal was observed. The resulting material was a low viscosity, transparent liquid with reddish-orange color. The RI, YI, and color of the solution were measured and are provided in Table 8.

TABLE 8

| | Example | | | |
|---|---|---|---|---|
| Component | 43 | 44 | 45 | 46 |
| Sol C (g) | 200 | 105 | 100 | 103.04 |
| TEA (g) | — | 0.64 | 0.33 | 0.95 |
| PEA (g) | 20 | 10.15 | 10.04 | 10 |
| YI | 48.52 | 5.60 | 28.12 | 12.9 |
| L | 96.05 | 101.54 | 102.14 | 104.19 |
| a | 0.04 | −0.24 | −1.53 | −1.49 |
| b | 31.09 | 3.36 | 18.42 | 8.48 |
| RI | | 1.5431 | | |
| | low viscosity, transparent liquid reddish-orange color | low viscosity, transparent liquid pale yellow color | low viscosity, transparent liquid pale yellow color | low viscosity, transparent liquid pale yellow color |

Examples 44–46 were prepared by adding triethylamine (TEA) to an amount of Sol C with rapid stirring according to the formulations in Table 8. An amount of PEA was then added slowly with rapid stirring. The solutions were solvent stripped as in Example 43. The RI and color of the solutions are provided in Table 8.

It was surprisingly found that the addition of small amounts of organic amine to a treated titanium oxide sol resulted in a treated titanium oxide sol/UV polymerizable diluent composition having significantly reduced color. The amount of organic amine added to the treated titanium oxide sol can be carefully chosen to provide the optimum color benefit.

Although the addition of an organic base to the titanium oxide sols provide a color benefit, the amount of base must be chosen to result in a stable sol. Example 47 was prepared by adding 2.0 g of TEA to 100 g of the treated titanium oxide sol of Example 6 using rapid stirring. After addition of the TEA, the solution turned milky and after about one minute had formed a viscous, white, gelatinous material containing a precipitate. Reducing the amount of TEA to 0.5 g in Example 48 resulted in a clear solution with no precipitate. Ten grams of PEA was added to the second solution with stirring followed by the removal of the solvent with reduced pressure and a temperature of about 40° C. The resulting treated titanium oxide nanoparticle/PEA mixture was a transparent, low viscosity, pale yellow liquid.

Examples 49–52 were prepared from the titanium oxide/UV polymerizable compositions of Examples (43–46) combined with RDX51027 at ratio of 1:1 by weight and 0.5 weight percent Darocur 4265. The mixtures were then coated onto polycarbonate film using the lamination process and cured with an H bulb. The haze and percent transmission data obtained for the samples is shown in Table 9.

TABLE 9

| Component | Example | | | |
|---|---|---|---|---|
| | 49 | 50 | 51 | 52 |
| TiOx/PEA source | Ex. 43 | Ex. 44 | Ex. 45 | Ex. 46 |
| % Haze | 0.97 | 0.66 | 0.66 | 0.56 |
| % Transmittance | 90.3 | 91.4 | 91.1 | 91.6 |
| YI | 7.8 | 5.9 | 6.6 | 4.6 |

As shown in Table 9 the treated titanium oxide sols prepared with an organic base results in cured films of acrylates comprising such sols exhibiting reduced color, reduced haze, and good transmittance of light. It has been unexpectedly discovered that small quantities of organic base provide stable treated titanium oxide sols that are excellent as high RI additives to polymerizable compositions to result in cured material possessing good color and good optical properties.

Examples 53–56

Preparation of Treated Titanium Oxide Sols Treated with Organosilanes that are Unreactive to Free Radical Polymerization Sol D was prepared by slowly adding 105.7 g of TiOPr to a rapidly stirring mixture of 1,005 g IPA, 49.4 g concentrated HCl (37% by weight), and 5.3 g deionized water. The mixture was allowed to stir for 4 days at room temperature prior to use.

Example 53 was prepare by adding 3.99 g of MAPTMS to 333 g of Sol D and the solution was heated at 50° C. for 5 hours with stirring. The solution was allowed to cool to room temperature and 15 g of PEA was slowly added to 150 g of the cooled solution with rapid stirring. The solvent was stripped off at 40–50° C. under reduced pressure using a rotary evaporator. The resulting material was a low viscosity, transparent liquid with a reddish-orange color. The color and refractive index data obtained is provided in Table 10.

Example 54 was prepared by quickly adding 1.30 g of hexamethyldisilazane (HMDZ) to 333 g of rapidly stirring Sol D. A precipitate was immediately observed upon the addition of HMDZ which was removed from the solution by vacuum filtration. Based on analysis, this precipitate is believed to be ammonium chloride. PEA (15 g) was slowly added to 150 g of the filtered solution using rapid stirring. The solvent was stripped off as described above. During the solvent stripping process a precipitate was formed which was removed by vacuum filtration. Based on analysis, this precipitate was believed to be ammonium chloride. The filtered solution was a low viscosity, transparent liquid. The color and refractive index of this solution was measured and the results are provided in Table 10.

Sol E was prepared from 105 g of TiOPr, 1,000 g IPA, 49.1 g concentrated HCl (37% by weight), and 5.3 g DI water. The mixture was allowed to stir for approximately 12 hours at room temperature.

Example 55 was prepared from 3.99 g of MAPTMS and 333 g of Sol E and the solution heated at 50° C. for 5.5 hours. PEA (15.2 g) was slowly added to this mixture (150.1 g) followed by removal of the solvent as described previously. The refractive index of the solution was determined to be 1.5691.

Example 56 was prepared by adding 3.19 g of phenyltrimethoxysilane to 333 g of Solution E and heated at 50° C. for 5.5 hours with stirring. The solution was allowed to cool to room temperature and 15.1 g of PEA was slowly added to 150.1 g of the solution with rapid stirring. The solvent was stripped from the resulting solution and the refractive index of the solution was determined to be 1.5739.

Sol F was prepared from 210 g of TiOPr, 2,000 g IPA, 98.1 g concentrated HCl (37% by weight), and 10.5 g DI water. The mixture was allowed to stir for approximately 24 hours at room temperature.

Sol G was prepared from 6.4 g of phenyl trimethoxysilane added to 400 g of Sol F and heating for approximately 5 hours at 50° C.

Sol H was prepared from 7.3 g of phenethyl trimethoxysilane added to 400 g of Sol F and heating for approximately 5 hours at 50° C.

Example 57 was prepared from 12 g of PEA slowly added to 120 g of Sol G using rapid stirring followed by stripping of solvent. The color and refractive index of the solution are provided in Table 10.

TABLE 10

| | Example | | | | | | |
|---|---|---|---|---|---|---|---|
| | 53 | 54 | 55 | 56 | 57 | 58 | 59 |
| YI | 52.00 | 34.26 | — | — | 50.23 | 21.75 | 54.06 |
| L | 94.34 | 95.81 | — | — | 94.45 | 98.35 | 93.25 |
| a | 2.73 | −0.48 | — | — | 1.00 | −1.12 | 1.20 |
| b | 31.63 | 21.1 | — | — | 31.52 | 13.52 | 34.00 |
| RI | 1.5507 | 1.5461 | 1.5691 | 1.5739 | 1.5682 | 1.5356 | 1.5649 |

Example 58 was prepared by adding 0.4 g of TEA to 120 g of Sol G using rapid stirring followed by the slow addition of 12 g of PEA, again with rapid stirring. After the solvent was stripped, the resulting material was a low viscosity, transparent liquid with pale yellow color. The results of the color measurement are provided in Table 10.

Example 59 was prepared by slowly adding 12 g of PEA to 120 g of Sol H using rapid stirring followed by removal of the solvent. The color and refractive index of solution are provided in Table 10.

As the results in Table 10 illustrate, use of high RI organosilanes such as phenyl trimethoxysilane and phenethyl trimethoxysilane to functionalize the titanium oxide sols resulted in high RI titanium oxide sol/UV polymerizable compositions (Examples 56–59).

Each of the titanium oxide/acrylate mixtures of Examples 57–59 was combined with RDX51027 at ratio of 1:1 by weight and 0.5 weight percent Darocur 4265. The solutions were then coated on to polycarbonate film using the lamination process and cured with an H bulb at a speed of 100% and a pressure of 30 psi. The haze and percent transmission data obtained for the samples (Examples 60–62) are shown in Table 11.

TABLE 11

| Component | Example | | |
|---|---|---|---|
| | 60 | 61 | 62 |
| TiOx/PEA source | Ex. 57 | Ex. 58 | Ex. 59 |
| % Haze | 0.79 | 1.60 | 0.97 |
| % Trans. | 90.1 | 90.6 | 89.9 |
| YI | 9.0 | 5.5 | 7.8 |

The results in Table 11 illustrate that the addition of an organic base to the treated titanium oxide sol resulted in a cured material exhibiting low color (Example 61) as compared to the sol not treated with an organic base (Example 60).

Sol I was prepared from 105 g of TiOPr, 1,000 g IPA, 24.53 g concentrated HCl (37% by weight), and 14.33 g DI water. The mixture was allowed to stir for approximately 24 hours at room temperature.

Sol J was prepared by adding 10 g of MAPTMS to 500 g of Sol I and heating for approximately 5 hours at 50° C.

Sol K was prepared by adding 9.88 g of diphenyl dimethoxysilane to 500 g of Sol I and heating for approximately 5 hours at 50° C.

Example 63 was prepared by slowly adding 12 g of PEA to 120 g of Sol J using rapid stirring. Solvent was stripped off as described above. The color and refractive index of the solution is provided in Table 12.

Example 64 was prepared by adding 0.4 g of TEA to 120 g of Sol J using rapid stirring. PEA (12 g) was added slowly using rapid stirring and the solvent was stripped off. The color and refractive index of the solution are provided in Table 12.

Example 65 was prepared with 12 g of PEA and 120 g of Sol K according to the process of Example 63. The color and refractive index of solution are shown in Table 12.

Example 66 was prepared with 0.65 g of TEA, 120 g of Sol J, and 12 g of PEA according to the process in Example 64. Table 12 contains the color and refractive index of the resulting solution.

TABLE 12

|    | Example |        |        |        |
|----|---------|--------|--------|--------|
|    | 63      | 64     | 65     | 66     |
| YI | 51.14   | 35.39  | 29.75  | 24.50  |
| L  | 95.09   | 96.89  | 97.56  | 98.93  |
| a  | 1.68    | 0.31   | -0.95  | -0.52  |
| b  | 31.26   | 21.40  | 18.55  | 14.75  |
| RI | 1.5546  | 1.5485 | 1.5604 | 1.5441 |

Table 12 further illustrates the benefit of the addition of a small amount of organic base to the treated titanium oxide sol in the reduction of color of the resulting titanium oxide sol/UV polymerizable composition. Examples 64 and 66 both contained sol J and TEA and exhibit significantly less color (YI) as compared to Example 63, which did not contain the base. Also shown is the benefit of using a high RI organosilane to treat the titanium oxide nanoparticles. Example 65, containing diphenyldimethoxysilane, provides a material having a higher RI than Example 63 containing MAPTMS, which is a lower RI organosilane.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method of making metal oxide nanoparticles, comprising:
   hydrolyzing metal alkoxide with an acidic alcohol solution, wherein the acidic alcohol solution comprises an alkyl alcohol, water, and an acid to form a first sol comprising metal oxide nanoparticles;
   treating the first sol with an organosilane to form a second sol comprising treated metal oxide nanoparticles; and
   treating the second sol with an organic base in an amount of about 0.1:1 to about 0.9:1 molar ratio of organic base to acid to form a third sol comprising treated metal oxide nanoparticles.

2. The method of claim 1, wherein the metal is titanium, cerium, zirconium, or tin; and the alkoxide is a linear or branched $C_1$–$C_{12}$ alkoxide.

3. The method of claim 1, wherein the acid is present in an amount of about 0.1:1 to about 2:1 molar ratio of acid to metal alkoxide.

4. The method of claim 1, wherein the water is present in an amount of about 0.1:1 to about 5:1 molar ratio of water to metal alkoxide.

5. The method of claim 1, wherein the organosilane is an alkoxyorganosilane, an aryloxyorganosilane, an arylalkoxyorganosilane, an arylalkylalkoxyorganosilane, an alkylaminoorganosilane, or a combination comprising at least one of the foregoing organosilanes.

6. The method of claim 1, wherein the organosilane lacks groups reactive with a polymerizable compound.

7. The method of claim 1, wherein the organosilane is in an amount of about 1:1 to about 1:10 molar ratio of metal alkoxide to organosilane.

8. The method of claim 1, wherein the organic base is a linear or branched chain $C_1$–$C_{12}$ alkylamine.

9. The method of claim 1, wherein the second sol is formed at a temperature of about 25° C. to about 100° C. for about 8 hours.

10. The method of claim 1, further comprising combining a polymerizable compound with the third sol to form a mixture; and removing solvent from the mixture to form a polymerizable composition.

11. The method of claim 10, wherein the polymerizable composition exhibits a yellowness index of less than about 30 as measured by ASTM D1925 using a path length of 1 mm.

12. The method of claim 10, further comprising combining an initiator with the third sol.

13. A method of making titanium oxide nanoparticles, comprising:
   hydrolyzing titanium tetraalkoxide with an acidic alcohol solution to form a first sol comprising titanium oxide nanoparticles, wherein the acidic alcohol solution comprises
   an alkyl alcohol,
   water in an amount of about 0.1:1 to about 5:1 molar ratio of water to titanium tetraalkoxide, and
   an acid in an amount of about 0.1:1 to about 2:1 molar ratio of acid to titanium tetraalkoxide;
   treating the first sol with an organosilane to form a second sol comprising treated titanium oxide nanoparticles; and
   treating the second sol with an organic base in an amount of about 0.1:1 to about 0.9:1 molar ratio of organic base to acid to form a third sol comprising treated titanium oxide nanoparticles.

14. The method of claim 13, further comprising combining a polymerizable compound with the third sol to form a mixture; and removing solvent from the mixture to form a polymerizable composition.

15. The method of claim 14, wherein the polymerizable composition exhibits a yellowness index of less than about 30 as measured by ASTM D1925 using a path length of 1 mm.

* * * * *